US012810562B2

(12) United States Patent
Lee et al.

(10) Patent No.: US 12,810,562 B2
(45) Date of Patent: Nov. 24, 2026

(54) METHOD AND SYSTEM FOR GENERATING NEURAL PASSTHROUGH IMAGES BASED ON OCCLUSION MASKS

(71) Applicant: Korea Electronics Technology Institute, Seongnam-si (KR)

(72) Inventors: Byoung Hyo Lee, Seoul (KR); Sung Hee Hong, Seoul (KR); Young Min Kim, Seoul (KR); Ji Soo Hong, Seoul (KR); Jin Soo Jeong, Seoul (KR); Yong Hwa Kim, Seoul (KR); Hyeon Chan Oh, Seoul (KR); Kyoon Hyung Yoo, Seoul (KR)

(73) Assignee: Korea Electronics Technology Institute, Seongnam-si (KR)

(*) Notice: Subject to any disclaimer, the term of this patent is extended or adjusted under 35 U.S.C. 154(b) by 59 days.

(21) Appl. No.: 19/004,993

(22) Filed: Dec. 30, 2024

(65) Prior Publication Data

US 2026/0170768 A1 Jun. 18, 2026

(30) Foreign Application Priority Data

Dec. 16, 2024 (KR) ........................ 10-2024-0186685

(51) Int. Cl.
*G06T 19/00* (2011.01)
*G06T 7/55* (2017.01)
*G06V 10/26* (2022.01)
*G06V 10/82* (2022.01)

(52) U.S. Cl.
CPC .............. *G06T 19/006* (2013.01); *G06T 7/55* (2017.01); *G06V 10/26* (2022.01); *G06V 10/82* (2022.01)

(58) Field of Classification Search
CPC ......... G06T 19/006; G06T 7/55; G06V 10/82; G06V 10/26
See application file for complete search history.

(56) References Cited

U.S. PATENT DOCUMENTS

2024/0153223 A1* 5/2024 Tovchigrechko ...... G06V 10/26
2024/0169673 A1* 5/2024 Xiong .................. G06T 19/006

FOREIGN PATENT DOCUMENTS

EP 3590027 B1 * 12/2022 ........... H04N 13/383
KR 10-2023-0116765 A 8/2023

OTHER PUBLICATIONS

Xiao, Lei, et al. ("Neuralpassthrough: Learned real-time view synthesis for vr." ACM SIGGRAPH 2022 Conference Proceedings. 2022) (Year: 2022).*
Xiao, Lei, et al., "NeuralPassthrough: Learned Real-Time View Synthesis for VR", ACM SIGGRAPH 2022 Conference Proceedings, arXiv:2207.02186v1, Aug. 7-11, 2022, (9 Pages in English).
Korean Office Action Issued on Mar. 19, 2026, in Counterpart Korean Patent Application No. 10-2024-0186685 (7 Pages in English, 11 Pages in Korean).

* cited by examiner

*Primary Examiner* — Xin Sheng
(74) *Attorney, Agent, or Firm* — NSIP Law

(57) ABSTRACT

Provided are a method and a system for generating neural passthrough images based on occlusion masks. A passthrough image generation method according to an embodiment may estimate an occlusion area from an image reprojected from a camera viewpoint to a user eye viewpoint and an occlusion mask by using a deep learning network. Accordingly, passthrough XR images may be prevented from being blurred by Gaussian filtering in a passthrough algorithm and user experience in an XR device may be enhanced.

20 Claims, 7 Drawing Sheets

METHOD AND SYSTEM FOR GENERATING NEURAL PASSTHROUGH IMAGES BASED ON OCCLUSION MASKS

CROSS-REFERENCE TO RELATED APPLICATION(S) AND CLAIM OF PRIORITY

This application is based on and claims priority under 35 U.S.C. § 119 to Korean Patent Application No. 10-2024-0186685, filed on Dec. 16, 2024, in the Korean Intellectual Property Office, the disclosure of which is herein incorporated by reference in its entirety.

BACKGROUND

Field

The disclosure relates to an extended reality (XR) technology, and more particularly, to a method and a system for generating passthrough images.

Description of Related Art

1. Problems of Passthrough Algorithms in XR

An XR device may use data resulting from photographing of an actual space with a camera mounted thereon to show an actual ambient environment to a user. In this case, the camera may be mounted on an outside of the XR device, and has a position different from the position of user's eyeball. That is, as shown in FIG. 1 there is a physical position gap corresponding to a thickness of a head mounted display (HMD) between an external camera and user's eyeball, and, when a camera image is used as it is, there is a mismatch between the camera viewpoint and the user eye view point.

2. Related-Art Methods

To solve the above-described problem, it may be envisioned that the viewpoint of the camera image is converted into the user's eye viewpoint by using two images taken by a stereo camera as shown in FIG. 2.

However, in this process, an occlusion area that is occluded from the camera viewpoint but should be seen from the eye viewpoint may occur as shown in FIG. 1, and it is necessary to estimate the occlusion area. This is typically achieved by a disocclusion algorithm based on the Gaussian filter.

The disocclusion algorithm adopts a method of filling an occlusion area by applying ta Gaussian filter to pixel values estimated as background. However, this may cause a problem that the occlusion area is blurred.

SUMMARY

The disclosure has been developed in order to solve the above-described problems, and an object of the disclosure is to provide a method for generating neural passthrough images based on occlusion masks as a solution to enhance a disocclusion algorithm in a passthrough algorithm.

To achieve the above-described object, a passthrough image generation method according to an embodiment may include: generating a left-eye image which is an image of a left-eye viewpoint from left camera point cloud data; generating a right-eye image which is an image of a right-eye viewpoint from right camera point cloud data; generating a left-eye mask which is a mask for an occlusion area of the left-eye image; generating a right-eye mas which is a mask for an occlusion area of the right-eye image; generating a final left-eye image in which the occlusion area is filled from the left-eye image, the left-eye mask, the right-eye image, and the right-eye mask; and generating a final right-eye image in which the occlusion area is filled from the right-eye image, the right-eye mask, the left-eye image, and the left-eye mask.

The occlusion area may be an area that is occluded from a camera viewpoint but is seen from an eyeball viewpoint. The occlusion area may be generated due to a difference between the camera viewpoint and the eyeball viewpoint caused by a distance between a camera and a user eyeball.

Generating the final left-eye image and generating the final right-eye image may be performed by using a neural network that is pre-trained to receive a left-eye image, a left-eye mask, a right-eye image, and a right-eye mask and to predict a final left-eye image and a final right-eye image in which occlusion areas are filled.

The left-eye image, the left-eye mask, the right-eye image, and the right-eye mask may be stacked in a color channel and may be inputted to the neural network. The neural network may be implemented by a U-net structure.

Generating the left-eye image may include generating the left-eye image by reprojecting the left-eye camera point cloud data to a left-eye viewpoint from a left camera viewpoint, and generating the right-eye image may include generating the right-eye image by reprojecting the right camera point cloud data to a right-eye viewpoint from a right camera viewpoint.

According to the disclosure, the passthrough image generation method may further include: generating a left camera image which is an image of a left camera viewpoint; generating a right camera image which is an image of a right camera viewpoint; generating the left camera point cloud data which is point cloud data of the left camera viewpoint, from the left camera image; and generating the right camera point cloud data which is point cloud data of the right camera viewpoint, from the right camera image.

According to the disclosure, the passthrough image generation method may further include estimating a depth map by using the left camera image and the right camera image generated, and generating the left camera point cloud data may include generating the left camera point cloud data from the left camera image by using the generated depth map, and generating the right camera point cloud data may include generating the right camera point cloud data from the right camera image by using the generated depth map.

According to another aspect of the disclosure, there is provided a passthrough image display apparatus including: a processor configured to: generate a left-eye image which is an image of a left-eye viewpoint from left camera point cloud data; generate a right-eye image which is an image of a right-eye viewpoint from right camera point cloud data; generate a left-eye mask which is a mask for an occlusion area of the left-eye image; generate a right-eye mas which is a mask for an occlusion area of the right-eye image; generate a final left-eye image in which the occlusion area is filled from the left-eye image, the left-eye mask, the right-eye image, and the right-eye mask; and generate a final right-eye image in which the occlusion area is filled from the right-eye image, the right-eye mask, the left-eye image, and the left-eye mask; and a display configured to display the final left-eye image and the final right-eye image which are generated by the processor.

According to still another aspect of the disclosure, there is provided a passthrough image display method including: generating a left-eye mask which is a mask for an occlusion area of a left-eye image; generating a right-eye mask which is a mask for an occlusion area of a right-eye image;

generating a final left-eye image in which the occlusion area is filled from the left-eye image, the left-eye mask, the right-eye image, and the right-eye mask; generating a final right-eye image in which the occlusion area is filled from the right-eye image, the right-eye mask, the left-eye image, and the left-eye mask; and displaying the final left-eye image and the final right-eye image generated.

According to embodiments of the disclosure as described above, by estimating occlusion areas from images reprojected from a camera viewpoint to a user eye viewpoint and occlusion masks by using a deep learning network, passthrough XR images may be prevented from being blurred by disocclusion in a passthrough algorithm, and user experience in the XR device may be enhanced.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiments of the disclosure propose a method and a system for generating neural passthrough images based on occlusion masks. The disclosure relates to a technology that estimates an occlusion area from an image reprojected from a camera viewpoint to a user eye viewpoint and an occlusion mask by using a deep learning network, rather than estimating the occlusion area based on a Gaussian filter.

Figure 1:
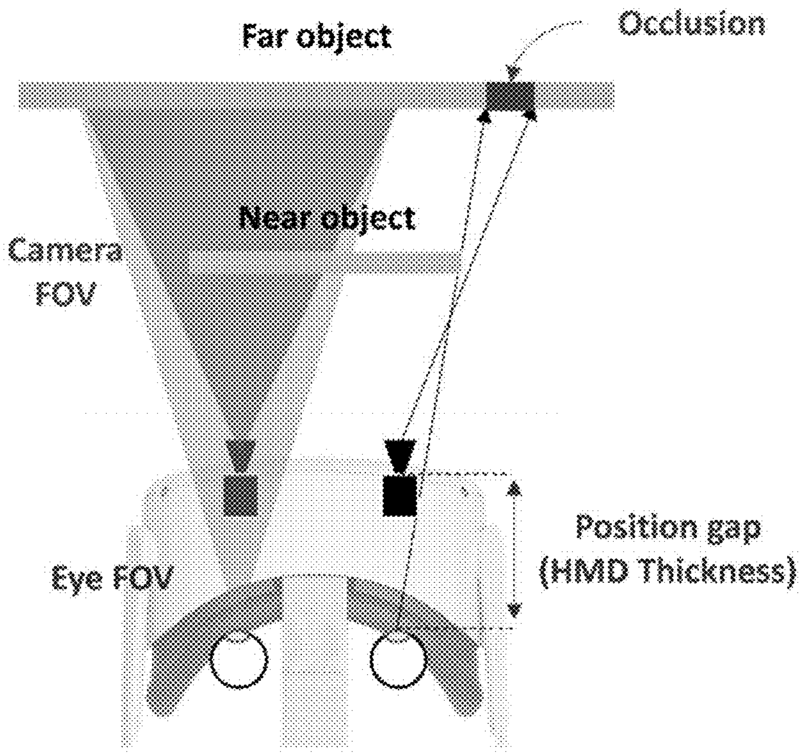
FIG. 1 (Related Art)
FIG. 1 is a view illustrating a problem of passthrough of an XR device.
Figure 2:
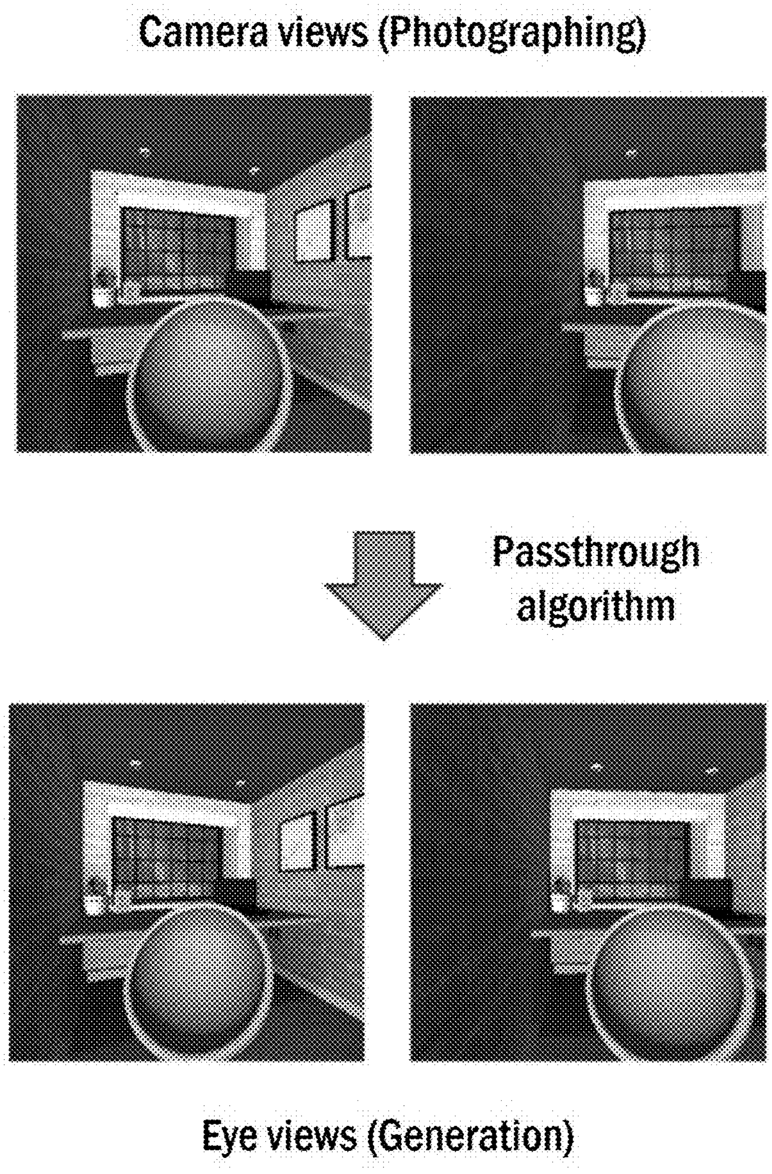
FIG. 2 (Related Art)
FIG. 2 is a view illustrating a concept of passthrough of an XR device.
Figure 3:
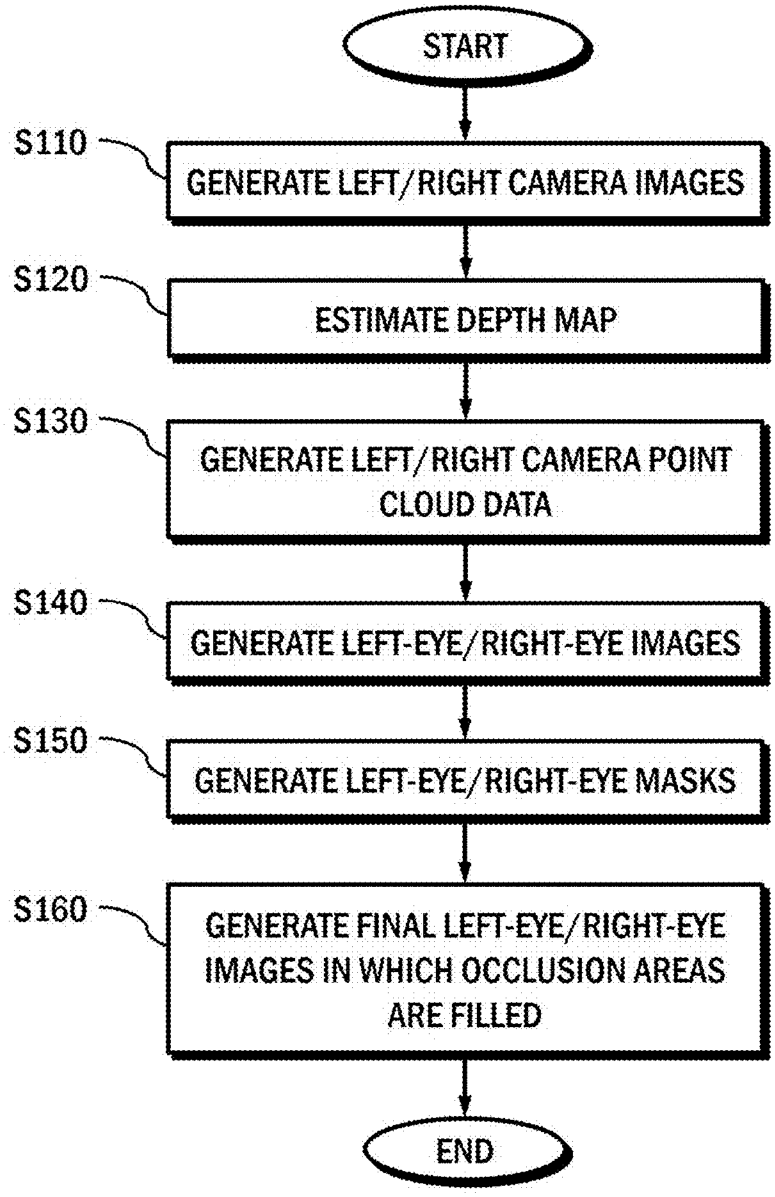
FIG. 3 is a view illustrating a passthrough XR image generation method according to an embodiment of the disclosure.

FIG. 3 is a view illustrating a flow of a passthrough XR image generation method according to an embodiment of the disclosure.

To generate a passthrough XR image, a left camera image which is an image of a left camera viewpoint is generated, and a right camera image which is an image of a right camera viewpoint is generated by using a stereo camera installed on an outside of an HMD (S110).

Figure 4:
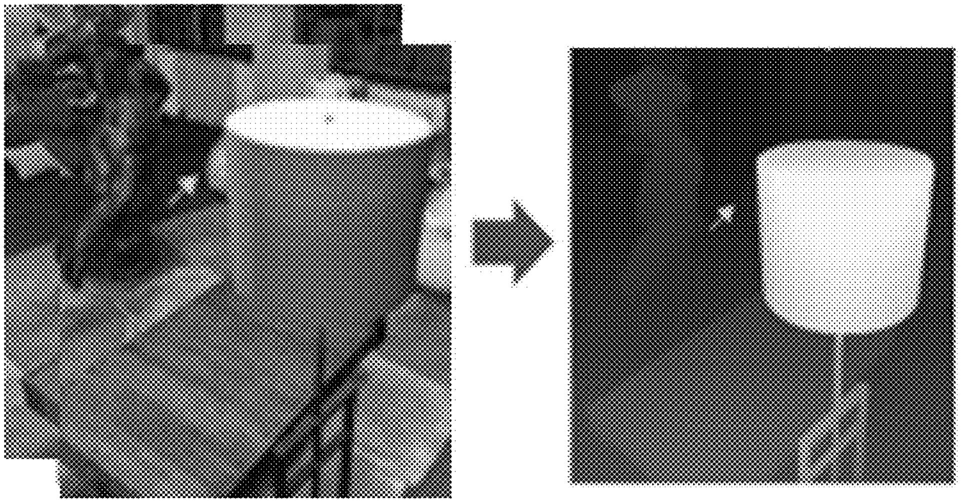
FIG. 4 is a view illustrating an example of depth map estimation.

A depth map is estimated by using the left camera image and the right camera image which are generated at step S110 (S120). FIG. 4 illustrate a result of estimating a depth map from the left camera image and the right camera image.

By using the depth map estimated at step S120, left camera point cloud data which is point cloud data of the left camera viewpoint is generated from the left camera image, and right camera point cloud data which is point cloud data of the right camera viewpoint is generated from the right camera image (S130).

A left-eye image which is an image of the left-eye viewpoint is generated from the left camera point cloud data converted at step S130, and a right-eye image which is an image of the right-eye viewpoint is generated from the right camera point cloud data converted at step S130 (S140).

At step S140, the left-eye image may be generated by reprojecting the left camera point cloud data to the left-eye viewpoint from the left camera viewpoint, and the right-eye image may be generated by reprojecting the right camera point cloud data to the right-eye viewpoint from the right camera viewpoint.

The left-eye image and the right-eye image generated by reprojecting are bound to have occlusion areas. The occlusion area refers to an area that is occluded from the camera viewpoint, but should be seen from the eyeball viewpoint. In the upper views of FIG. 5, the black areas around the cylindrical object in the left-eye image and the right-eye image are occlusion areas.

Figure 5:
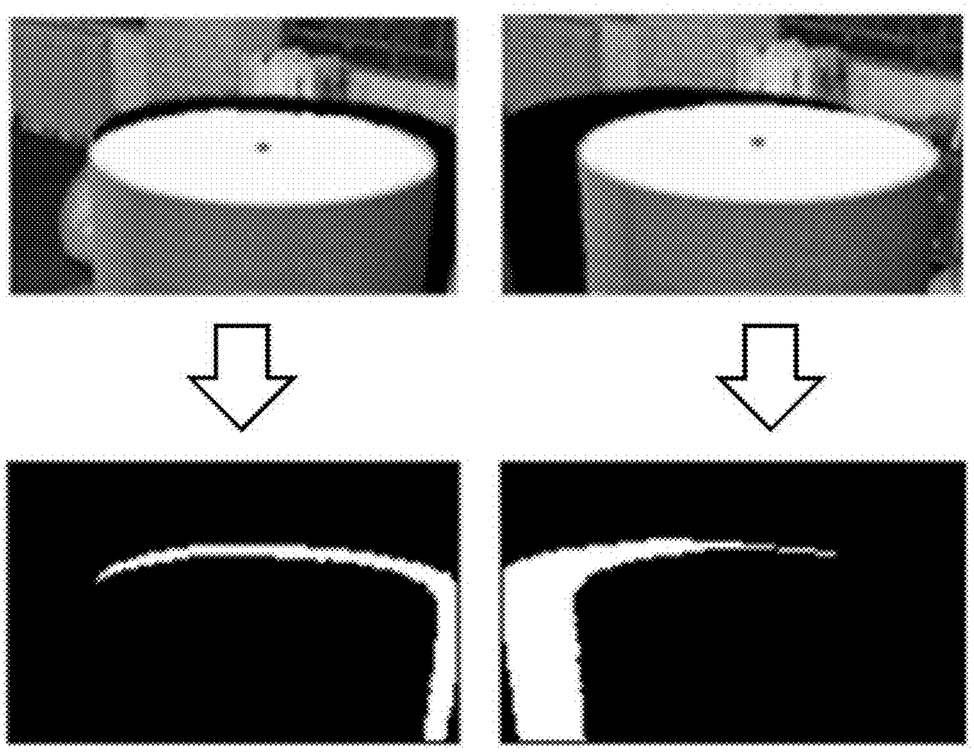
FIG. 5 is a view illustrating examples of occlusion area occurrence and mask generation.

In response to this, a left-eye mask which is a mask for the occlusion area of the left-eye image is generated, and a right-eye mask which is a mask for the occlusion area of the right-eye image is generated (S150). The lower views of FIG. 5 illustrate results of generating the left-eye mask and the right-eye mask for the left-eye image and the right-eye image where the occlusion areas occur.

A final left-eye image and a final right-eye image in which the occlusion areas are filled are generated from the left-eye image and the right-eye image generated at step S140, and the left-eye mask and the right-eye mask generated at step S150 (S160).

Step S160 may be performed by an occlusion estimation model which is a neural network that is pre-trained to receive a left-eye image, a left-eye mask, a right-eye image, and a right-eye mask and to predict a final left-eye image and a final right-eye image in which occlusion areas are filled.

To achieve this, the left-eye image, the left-eye mask, the right-eye image, and the right-eye mask are stacked in a color channel and are inputted to the occlusion estimation model. The occlusion estimation model may be implemented by U-net, but there is no limit to the use of other network structures.

Figure 6:
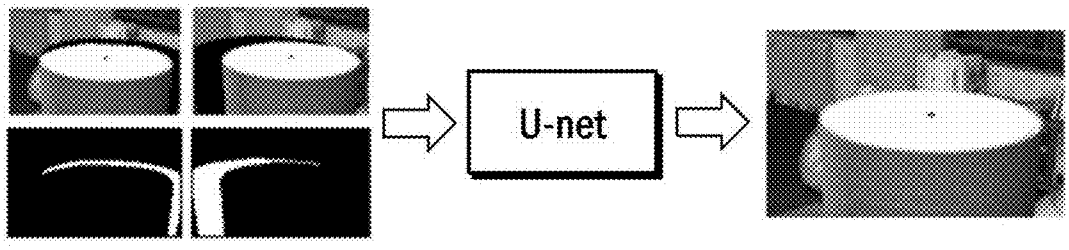
FIG. 6 is a view illustrating an example of a result of predicting a final left-eye image using U-net.

FIG. 6 illustrates a result of predicting the final left-eye image from the left-eye image, the left-eye mask, the right-eye image, and the right-eye mask by using U-net. In the same way, the final right-eye image may be predicted from the left-eye image, the left-eye mask, the right-eye image, and the right-eye mask by using U-net.

Figure 7:
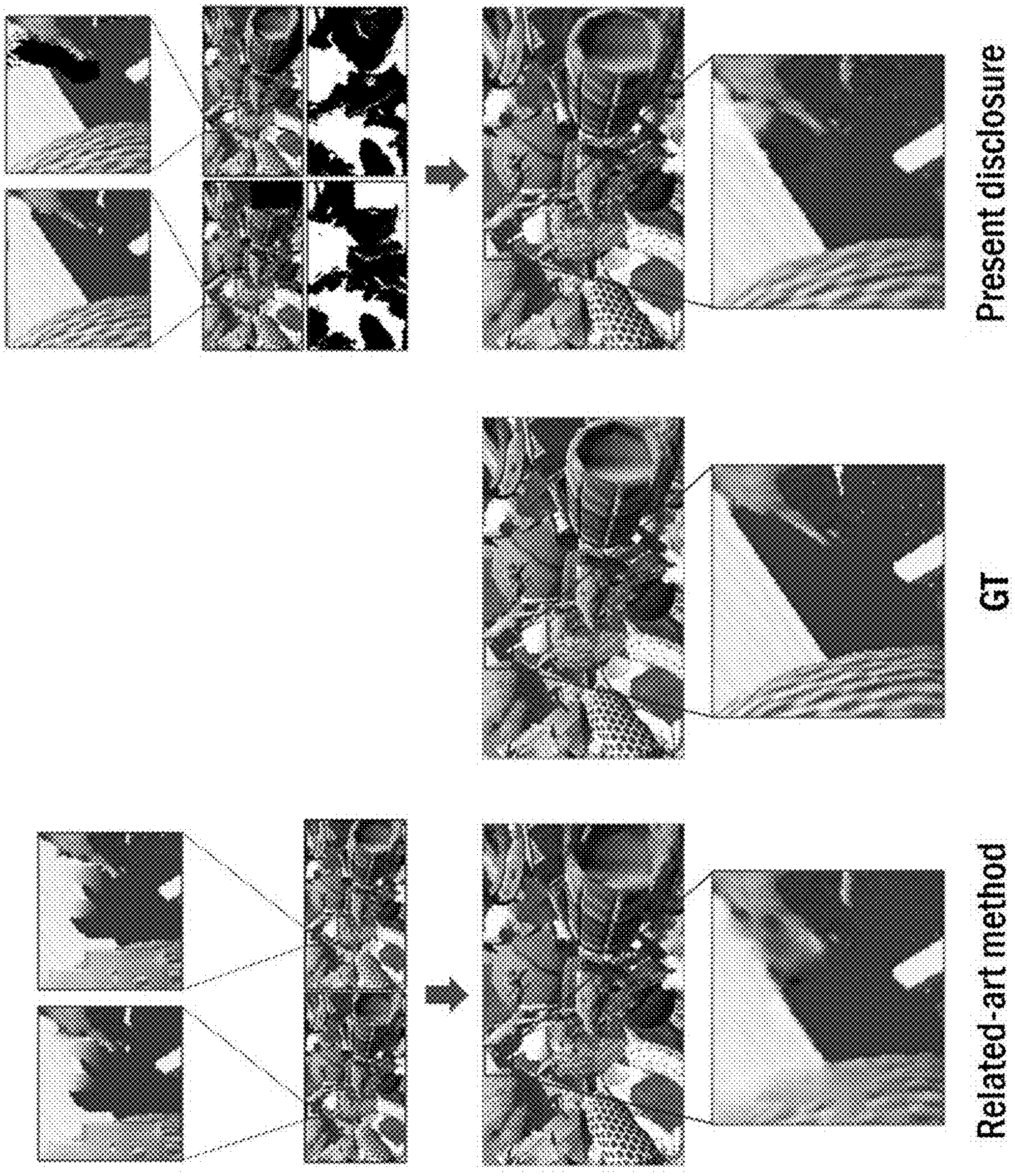
FIG. 7 is a view illustrating comparison of results of a related-art method and a method according to an embodiment of the disclosure.

FIG. 7 illustrates comparison of a result of a related-art method and a result of the method according to an embodiment of the disclosure. Since the related-art method may estimate occlusion areas by Gaussian filtering, it can be seen that there are many blurred portions compared to ground truth (GT) even when images are processed by a neural network thereafter.

However, the method according to an embodiment of the disclosure causes the neural network to predict occlusion areas in the first place by referring to occlusion masks, without going through the process of estimating occlusion areas by Gaussina filtering, so that it may be identified that the occlusion areas are filled more clearly and more exactly than in the related-art method.

Figure 8:
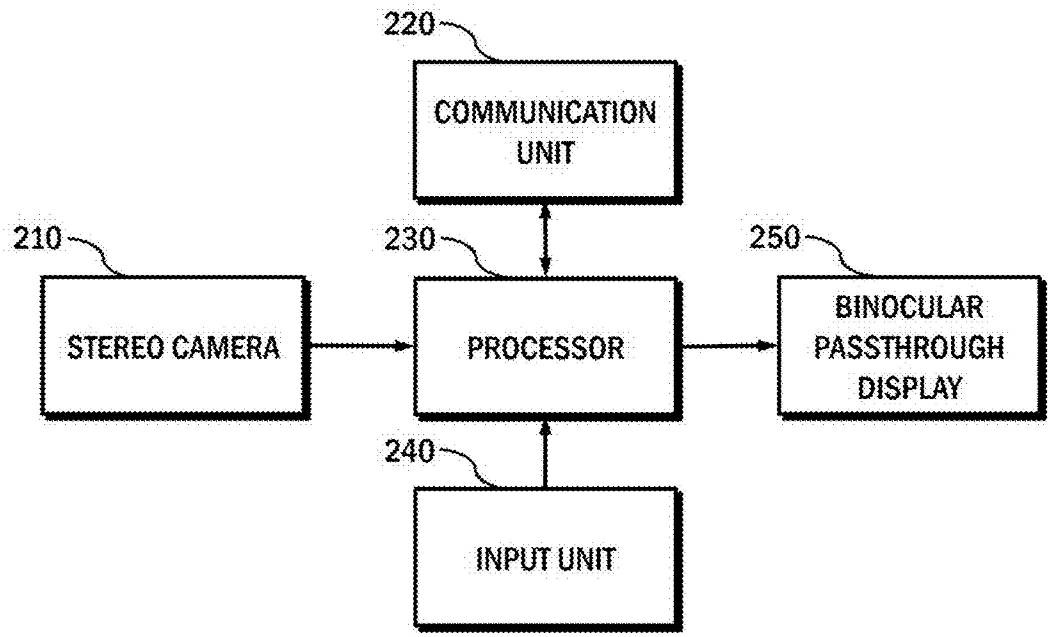
FIG. 8 is a view illustrating a configuration of an XR device according to another embodiment of the disclosure.

FIG. 8 is a view illustrating a configuration of an XR device according to another embodiment of the disclosure. The XR device according to an embodiment may be a device of an HMD type, and may include a stereo camera 210, a communication unit 220, a processor 230, an input unit 240, and a binocular passthrough display 250 to generate passthrough images based on a neural network.

The stereo camera 210 may be installed on an outside of the HMD, and may generate a left camera image and a right camera image and transfer the camera images to the processor 230.

The processor 230 may estimate a depth map by using the left camera image and the right camera image which are generated by the stereo camera 210, and may generate left camera point cloud data and right camera point cloud data from the left camera image and the right camera image, respectively, by using the estimated depth map.

The processor 230 may generate a left-eye image and a right-eye image by reprojecting the converted left camera point cloud data and right camera point cloud data to the left-eye viewpoint and the right-eye viewpoint, respectively.

In addition, the processor 230 may generate a left-eye mask and a right-eye mask which are masks for occlusion areas of the left-eye image and the right-eye image, and may generate a final left-eye image and a final right-eye image by inputting the left-eye image and the right-eye image, and the left-eye mask and the right-eye mask to an occlusion estimation model.

The binocular passthrough display 250 may display the final left-eye image and the final right-eye image generated by the processor 230.

The communication unit 220 may be a communication interface for connecting with an external network or an external device, and the input unit 240 may be a user interface for receiving a user command and transmitting the same to the processor 230.

Up to now, the method and system generating neural passthrough images based on occlusion masks has been described in detail with reference to preferred embodiments.

In the above-described embodiments, by estimating occlusion areas from images reprojected from the camera viewpoint to the user eye viewpoint and occlusion masks by using the deep learning network, passthrough XR images may be prevented from being blurred by disocclusion in a passthrough algorithm, and user experience in the XR device may be enhanced.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A passthrough image generation method comprising:

generating a left-eye image which is an image of a left-eye viewpoint from left camera point cloud data;

generating a right-eye image which is an image of a right-eye viewpoint from right camera point cloud data;

generating a left-eye mask which is a mask for an occlusion area of the left-eye image;

generating a right-eye mask which is a mask for an occlusion area of the right-eye image;

generating a final left-eye image in which the occlusion area is filled from the left-eye image, the left-eye mask, the right-eye image, and the right-eye mask; and generating a final right-eye image in which the occlusion area is filled from the right-eye image, the right-eye mask, the left-eye image, and the left-eye mask.

2. The passthrough image generation method of claim 1, wherein the occlusion area is an area that is occluded from a camera viewpoint but is seen from an eyeball viewpoint.

3. The passthrough image generation method of claim 2, wherein the occlusion area is generated due to a difference between the camera viewpoint and the eyeball viewpoint caused by a distance between a camera and a user eyeball.

4. The passthrough image generation method of claim 1, wherein generating the final left-eye image and generating the final right-eye image are performed by using a neural network that is pre-trained to receive a left-eye image, a left-eye mask, a right-eye image, and a right-eye mask and to predict a final left-eye image and a final right-eye image in which occlusion areas are filled.

5. The passthrough image generation method of claim 4, wherein the left-eye image, the left-eye mask, the right-eye image, and the right-eye mask are stacked in a color channel and are inputted to the neural network.

6. The passthrough image generation method of claim 4, wherein the neural network is implemented by a U-net structure.

7. The passthrough image generation method of claim 1, wherein generating the left-eye image comprises generating the left-eye image by reprojecting the left-eye camera point cloud data to a left-eye viewpoint from a left camera viewpoint, and wherein generating the right-eye image comprises generating the right-eye image by reprojecting the right camera point cloud data to a right-eye viewpoint from a right camera viewpoint.

8. The passthrough image generation method of claim 1, further comprising:

generating a left camera image which is an image of a left camera viewpoint;

generating a right camera image which is an image of a right camera viewpoint;

generating the left camera point cloud data which is point cloud data of the left camera viewpoint, from the left camera image; and generating the right camera point cloud data which is point cloud data of the right camera viewpoint, from the right camera image.

9. The passthrough image generation method of claim 8, further comprising estimating a depth map by using the left camera image and the right camera image generated, wherein generating the left camera point cloud data comprises generating the left camera point cloud data from the left camera image by using the generated depth map, and wherein generating the right camera point cloud data comprises generating the right camera point cloud data from the right camera image by using the generated depth map.

10. The passthrough image generation method of claim 1, wherein the occlusion area of the final left-eye image and the occlusion area of the final right-eye image are filled without applying a Gaussian filter to pixel values estimated as a background.

11. A passthrough image display apparatus comprising:

a processor configured to: generate a left-eye image which is an image of a left-eye viewpoint from left camera point cloud data; generate a right-eye image which is an image of a right-eye viewpoint from right camera point cloud data; generate a left-eye mask which is a mask for an occlusion area of the left-eye image; generate a right-eye mask which is a mask for an occlusion area of the right-eye image; generate a final left-eye image in which the occlusion area is filled from the left-eye image, the left-eye mask, the right-eye image, and the right-eye mask; and generate a final right-eye image in which the occlusion area is filled from the right-eye image, the right-eye mask, the left-eye image, and the left-eye mask; and a display configured to display the final left-eye image and the final right-eye image which are generated by the processor.

12. The passthrough image display apparatus of claim 11, wherein the passthrough image display apparatus is an extended reality (XR) device of a head mounted display (HMD) type, and wherein the display is a binocular passthrough display of the HMD.

13. The passthrough image display apparatus of claim 12, further comprising a stereo camera installed on an outside of the HMD and configured to generate a left camera image which is an image of a left camera viewpoint and a right camera image which is an image of a right camera viewpoint, wherein the processor is further configured to generate the left camera point cloud data which is point cloud data of the left camera viewpoint, from the left camera image, and to generate the right camera point cloud data which is point cloud data of the right camera viewpoint, from the right camera image.

14. The passthrough image display apparatus of claim 13, wherein the processor is further configured to estimate a depth map by using the left camera image and the right camera image, to generate the left camera point cloud data from the left camera image by using the estimated depth map, and to generate the right camera point cloud data from the right camera image by using the estimated depth map.

15. The passthrough image display apparatus of claim 13, wherein the occlusion area is an area that is occluded from a camera viewpoint of the stereo camera but is seen from an eyeball viewpoint of a user wearing the HMD, and wherein the occlusion area is generated due to a difference between the camera viewpoint and the eyeball viewpoint caused by a distance which corresponds to a thickness of the HMD between the stereo camera and an eyeball of the user.

16. The passthrough image display apparatus of claim 11, wherein the processor is configured to generate the final left-eye image and the final right-eye image by inputting the left-eye image, the left-eye mask, the right-eye image, and the right-eye mask to an occlusion estimation model which is a neural network pre-trained to receive a left-eye image, a left-eye mask, a right-eye image, and a right-eye mask and to predict a final left-eye image and a final right-eye image in which occlusion areas are filled, and wherein both the final left-eye image and the final right-eye image are predicted by the occlusion estimation model.

17. The passthrough image display apparatus of claim 16, wherein the left-eye image, the left-eye mask, the right-eye image, and the right-eye mask are stacked in a color channel and are inputted to the occlusion estimation model.

18. The passthrough image display apparatus of claim 16, wherein the occlusion estimation model is implemented by a U-net structure.

19. A passthrough image display method comprising:

generating a left-eye mask which is a mask for an occlusion area of a left-eye image;

generating a right-eye mask which is a mask for an occlusion area of a right-eye image;

generating a final left-eye image in which the occlusion area is filled from the left-eye image, the left-eye mask, the right-eye image, and the right-eye mask;

generating a final right-eye image in which the occlusion area is filled from the right-eye image, the right-eye mask, the left-eye image, and the left-eye mask; and displaying the final left-eye image and the final right-eye image generated.

20. The passthrough image display method of claim 19, wherein the left-eye image and the right-eye image are generated from a left camera image and a right camera image which are obtained by a stereo camera installed on an outside of a head mounted display (HMD), and wherein displaying the final left-eye image and the final right-eye image comprises displaying the final left-eye image and the final right-eye image on a binocular passthrough display of the HMD.

* * * * *